(12) United States Patent
Katayama et al.

(10) Patent No.: US 6,637,070 B2
(45) Date of Patent: Oct. 28, 2003

(54) GROMMET

(75) Inventors: Hiroyuki Katayama, Hiroshima (JP); Chikao Nishimoto, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/984,248

(22) Filed: Oct. 29, 2001

(65) Prior Publication Data

US 2002/0056563 A1 May 16, 2002

(30) Foreign Application Priority Data

Oct. 27, 2000 (JP) .................................... P. 2000-329477

(51) Int. Cl.$^7$ ................................................. H01B 17/26
(52) U.S. Cl. ....................... 16/2.1; 174/152; 174/153 G; 174/65 G; 277/616
(58) Field of Search ............................. 16/2.2; 277/602, 277/606, 610; 174/65 G, 153 G, 152 G

(56) References Cited

U.S. PATENT DOCUMENTS

| | | | | | |
|---|---|---|---|---|---|
| 4,685,173 | A | * | 8/1987 | Pavur ............................ | 16/2.2 |
| 5,981,877 | A | * | 11/1999 | Sakata et al. ............ | 174/153 G |
| 6,297,457 | B1 | * | 10/2001 | Yamada et al. ......... | 174/152 G |
| 6,442,794 | B2 | * | 9/2002 | Uchida et al. ................. | 16/2.1 |
| 6,506,974 | B2 | * | 1/2003 | Nakata ..................... | 174/65 G |

FOREIGN PATENT DOCUMENTS

| | | |
|---|---|---|
| JP | 61-23220 | 2/1986 |
| JP | 63-20590 | 2/1988 |
| JP | 9-120727 | 5/1997 |
| JP | 9-161579 | 6/1997 |
| JP | 9-289723 | 11/1997 |

* cited by examiner

*Primary Examiner*—Anthony Knight
*Assistant Examiner*—Enoch Peavey
(74) *Attorney, Agent, or Firm*—Sughrue Mion, PLLC

(57) ABSTRACT

A grommet includes a larger-diameter tubular portion for being fixed to a through hole, a smaller-diameter tubular portion for passing a wire therethrough, a shield wall of a conical wall-shape interconnecting the larger-diameter tubular portion and the smaller-diameter tubular portion, and a noise-insulating wall joined to an outer peripheral surface of the smaller-diameter tubular portion and flaring into a conical wall-shape. When the smaller-diameter tubular portion is displaced in a direction toward the distal end thereof, an outer peripheral edge of the noise-insulating wall contacts with an inner peripheral surface of the larger-diameter tubular portion, and when this displacement is canceled, the outer peripheral edge is engaged with an engagement portion on the larger-diameter tubular portion, so that the noise-insulating wall is reversed to be formed into a conical wall-shape in reverse to the initial shape, thereby forming a closed space between the noise-insulating wall and the shield wall.

9 Claims, 6 Drawing Sheets

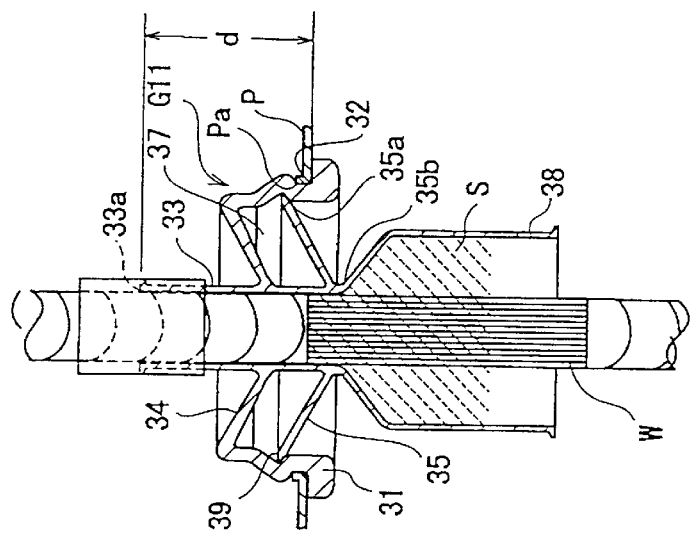
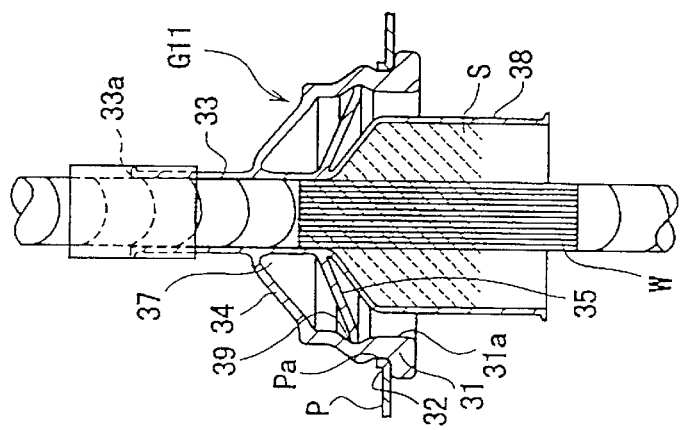
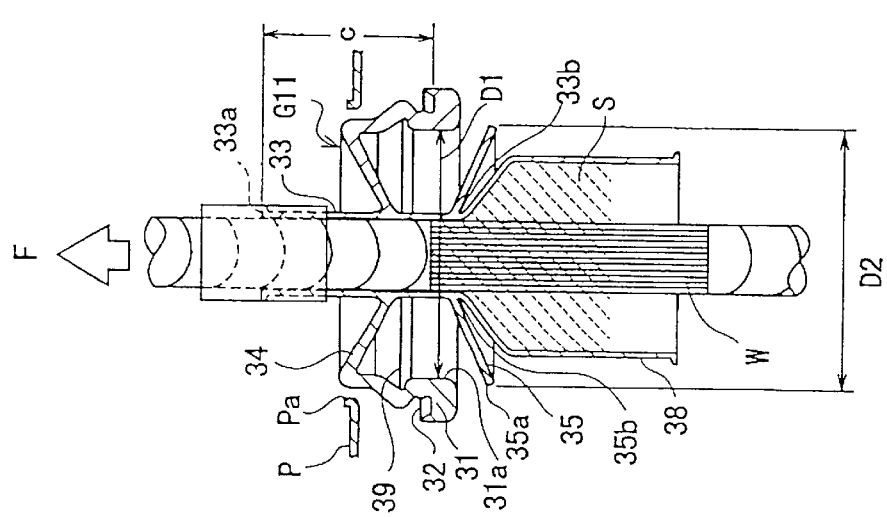

GROMMET

CROSS REFERENCE TO THE RELATED APPLICATION

The present application is based on Japanese patent application No. 2000-329477, the entire contents of which are incorporated herein by reference.

BACKGROUND OF THE INVENTION

1. Field of the Invention

This invention relates to a grommet of the type which forms an air layer (closed space) therein to enhance a noise-insulating effect.

2. Description of the Related Arts

One known grommet of this type is disclosed in JP-A-9-289723. FIGS. 5A to 5D are cross-sectional views showing the construction of the grommet, disclosed in this publication, and the process of mounting it on a panel.

This grommet G1, shown as the first conventional example, includes a larger-diameter tubular portion 1, having a fitting groove (fitting portion) 2 formed in its outer peripheral surface so as to fit on a peripheral edge of a through hole Pa in the panel P, a smaller-diameter tubular portion 3 for passing a wire (wire harness) W, passing through the panel through hole Pa, therethrough, a shield wall 4, which interconnects an axially-intermediate portion of the smaller-diameter tubular portion 3 and a distal end of the larger-diameter tubular portion 1 to close a space between the larger-diameter tubular portion 1 and the smaller-diameter tubular portion 3, and is elastically deformable so as to displace the smaller-diameter tubular portion 3 in the axial direction relative to the larger-diameter tubular portion 1, an annular noise-insulating wall 5, which is disposed closer to a proximal end 3b of the smaller-diameter tubular portion 3 than the shield wall 4 is, and extends radially outwardly perpendicularly from an outer peripheral surface of the smaller-diameter tubular portion 3, and an annular engagement projection 9 formed on an inner peripheral surface of the larger-diameter tubular portion 1 at a proximal end thereof.

For using this grommet G1, first, the wire harness W is passed through the smaller-diameter tubular portion 1, and then the wire W is passed through the panel through hole Pa as shown in FIG. 5A. Then, by pulling the wire W, a distal end 3a of the smaller-diameter tubular portion 1 is passed through the panel through hole Pa, and the larger-diameter tubular portion 3, connected to the shield wall 4, is brought into engagement with the peripheral edge of the panel through hole Pa, as shown in FIG. 5B. In this condition, when the wire W is further pulled, the shield wall 4 is stretched in the axial direction, with its inner peripheral portion pulled by the smaller-diameter tubular portion 3, and the larger-diameter tubular portion 1 is pulled by the shield wall 4, so that the fitting groove 2 becomes fitted on the peripheral edge of the panel through hole Pa, as shown in FIG. 5C. At this time, the smaller-diameter tubular portion 3 is displaced forward relative to the larger-diameter tubular portion 1 because of the deformation of the shield wall 4, and therefore an outer peripheral edge 5a of the noise-insulating wall 5, formed on the outer peripheral surface of the smaller-diameter tubular portion 3 at the proximal end 3b thereof, is forced through the annular engagement projection 9 to enter the interior of the larger-diameter tubular portion 1.

When the noise-insulating wall 5 thus enters the interior of the larger-diameter tubular portion 1, with the fitting groove 2 in the larger-diameter tubular portion 1 fitted on the peripheral edge of the panel through hole Pa, the application of the pulling force to the wire W is canceled. As a result, the smaller-diameter tubular portion 3 is returned toward its original position because of the restoring action of the shield wall 4 as shown in FIG. 5D, and the outer peripheral edge 5a of the noise-insulating wall 5 is engaged with the engagement projection 9 formed on the inner peripheral surface of the larger-diameter tubular portion 1, so that a closed space 7, in which the air is filled, is formed between the noise-insulating wall 5 and the shield wall 4. As a result, the noise-insulating ability of the grommet G1 is enhanced.

The type of grommet G2 as shown in FIGS. 6 and 7 is also known as another conventional example.

The grommet G2, shown as the second conventional example, includes a larger-diameter tubular portion 11, having a fitting groove 12 for a panel through hole, a smaller-diameter tubular portion 13 for passing a wire W therethrough, a shield wall 14, interconnecting the larger-diameter tubular portion 11 and the smaller-diameter tubular portion 13, and an annular noise-insulating wall 15 integrally connected at its outer peripheral edge 15a to an inner peripheral surface of the larger-diameter tubular portion 11. An inner peripheral edge 15b of the noise-insulating wall 15 is held in intimate contact with the outer peripheral surface of the wire W passed through the smaller-diameter tubular portion 13, thereby forming an air-filled, closed space 17 between the noise-insulating wall 15 and the shield wall 14.

In the first conventional grommet G1, the annular engagement projection 9 is formed on the inner peripheral surface of the larger-diameter tubular portion 1, and the outer peripheral edge 5a of the noise-insulating wall 5, formed on and projecting from the smaller-diameter tubular portion 3 in the direction perpendicular to the axis thereof, is engaged with the engagement projection 9, thereby forming the closed space 7 for noise-insulating purposes. However, in order that the final shape with the closed space 7, shown in FIG. 5D, can be maintained, the engagement projection 9 and the noise-insulating wall 5 need to have a certain degree of rigidity. Namely, the grommet G1 is of such a construction that the noise-insulating wall 5 is held in intimate contact with the engagement projection 9 by the restoring force of the shield wall 4 so as to maintain the noise-insulating ability, and therefore the noise-insulating wall 5 and the engagement projection 9 must be kept in the mutually-engaged condition against this restoring force.

Since the noise-insulating wall 5 and the engagement projection 9 have the increased rigidity, a large force is required in the process from the step of FIG. 5B to the step of FIG. 5C, that is, in the process of insertion of the noise-insulating wall 5 into the larger-diameter tubular portion 1 through the engagement projection 9, and this invited a problem that the noise-insulating wall 5 could not be easily inserted into the larger-diameter tubular portion 1.

In contrast, it may be proposed that the engagement projection 9 and the noise-insulating wall 5 are decreased in rigidity so as to reduce the inserting force. In such a case, however, the engagement projection 9 and the noise-insulating wall 5 can be easily disengaged from each other, and when this disengagement occurs, the air layer is lost, which leads to a possibility that the noise-insulating ability is not maintained.

And besides, in the final shape of FIG. 5D, the noise-insulating wall 5 is pressed against the engagement projection 9 (in order to positively maintain the intimate contact therebetween) by the restoring force of the shield wall 4, and therefore the smaller-diameter tubular portion 3 is not completely returned to its initial position, and there was encountered a problem that the dimension from the fitting groove 2 to the distal end of the grommet G1 before mounting the grommet on the panel P as shown in FIG. 5A was different from the dimension after mounting the grommet on the panel P as shown in FIG. 5D. Namely, the dimension a before mounting the grommet is increased to the dimension b after mounting the grommet. As a result, the wire W can not be mounted accurately in a predetermined position.

The second conventional grommet G2, shown in FIGS. 6 and 7, has no problem in so far as it is used in its original shape. However, in the case where the proximal end portion of the smaller-diameter tubular portion 13 is extended so as to increase a holding force for holding the wire W, or in the case where a filling cup portion 18 for being filled with a water-stopping material is further formed at the proximal end of the thus-extended smaller-diameter tubular portion 13, there is encountered a problem from the viewpoint of the production.

Namely, for forming the air layer (closed space 17), the production must be effected in such a manner that the inner peripheral edge 15b of the noise-insulating wall 15 is held in intimate contact with the outer peripheral surface of the smaller-diameter tubular portion 13. However, it is impossible to form such a configuration from the viewpoint of molding (from the viewpoint of removal of the molded product). Therefore, from a structural point of view, it is impossible to extend the proximal end portion of the smaller-diameter tubular portion 13 while providing the noise-insulating wall 15, and it was impossible to apply the technique of FIGS. 6 and 7 to the type of grommet in which the water-stopping material was filled.

SUMMARY OF THE INVENTION

In view of the foregoing, it is an object of this invention to provide a grommet which can solve the following problems.

(1) A noise-insulating wall can be inserted into a larger-diameter tubular portion with a small inserting force so as to form an air layer (closed space) for noise-insulating purposes.

(2) The noise-insulating wall, once inserted in the larger-diameter tubular portion, can be prevented from being withdrawn therefrom, thereby positively maintaining a noise-insulating effect.

(3) The position of a smaller-diameter tubular portion relative to the larger-diameter tubular portion after setting the grommet in a panel through hole will not much differ from that before setting the grommet in the panel through hole, so that a wire can be held in a predetermined position.

(4) The invention can be applied to the type in which a water-stopping material is filled.

According to the present invention there is provided a grommet characterized by the provision of:

a larger-diameter tubular portion having a fitting portion for fitting on a peripheral edge of a panel through hole;

a smaller-diameter tubular portion for passing a wire, passing through the panel through hole, therethrough;

a shield wall which interconnects an axially-intermediate portion of the smaller-diameter tubular portion and the larger-diameter tubular portion to close a space between the larger-diameter tubular portion and the smaller-diameter tubular portion, and is elastically deformable so as to displace the smaller-diameter tubular portion in an axial direction relative to the larger-diameter tubular portion; and a noise-insulating wall which is disposed closer to a proximal end of the smaller-diameter tubular portion than the shield wall is, and is flaring into a conical wall-shape in a direction of extending of the proximal end of the smaller-diameter tubular portion, and is joined at its inner peripheral edge to an outer peripheral surface of the smaller-diameter tubular portion, wherein when the smaller-diameter tubular portion is displaced relative to the larger-diameter tubular portion in a direction toward its distal end, an outer peripheral edge of the noise-insulating wall, provided as a free edge, is brought into sliding contact with an inner peripheral surface of the larger-diameter tubular portion, and in this condition, when the displacement is canceled, the outer peripheral edge is engaged with the inner peripheral surface of the larger-diameter tubular portion, so that the noise-insulating wall is reversed on its inner peripheral edge to be formed into a conical wall-shape whose direction is reverse to that of its initial shape, thereby forming a closed space between the noise-insulating wall and the shield wall.

For using this grommet, first, the wire is passed through the smaller-diameter tubular portion, and then the wire is passed through the panel through hole. Then, the wire is pulled, thereby passing the distal end of the smaller-diameter tubular portion through the panel through hole, and at the same time the larger-diameter tubular portion, connected to the shield wall, is brought into engagement with the peripheral edge of the panel through hole. In this condition, when the wire is further pulled, the shield wall is deformed in the axial direction, with its inner peripheral portion pulled by the smaller-diameter tubular portion, and the larger-diameter tubular portion is pulled by this shield wall, so that the fitting portion of the larger-diameter tubular portion becomes fitted on the peripheral edge of the panel through hole. At this time, the smaller-diameter tubular portion is displaced forward relative to the larger-diameter tubular portion because of the deformation of the shield wall, and therefore the outer peripheral edge of the noise-insulating wall, formed on the outer peripheral surface of the smaller-diameter tubular portion at the proximal end portion thereof, enters the interior of the larger-diameter tubular portion while this outer peripheral edge is held in sliding contact with the inner peripheral surface of the larger-diameter tubular portion. At this time, the noise-insulating wall has the conical wall-shape tapering in the direction of insertion of this wall into the larger-diameter tubular portion (that is, the direction of the conical wall-shape of the noise-insulating wall is the forward direction, i.e., the direction of insertion of this wall into the larger-diameter tubular portion), and therefore the noise-insulating wall can be easily inserted into the larger-diameter tubular portion with a small force without producing a large catching resistance.

When the noise-insulating wall thus enters the interior of the larger-diameter tubular portion, with the fitting portion of the larger-diameter tubular portion fitted on the peripheral edge of the panel through hole, the application of the pulling force to the wire is canceled. As a result, the smaller-diameter tubular portion is returned to its original position because of the restoring action of the shield wall, and the noise-insulating wall, which is retained at its outer peripheral edge by the larger-diameter tubular portion, is reversed on its inner peripheral edge to be formed into the conical wall-shape whose direction is reverse to that of its initial shape, thereby forming the closed space between this noise-insulating wall and the shield wall. This closed space functions as an air layer isolated from the exterior, so that the noise-insulating ability of the grommet is enhanced.

In this condition of use, in order that the outer peripheral edge of the noise-insulating wall can be disengaged from the larger-diameter tubular portion, the noise-insulating wall need to be reversed to be returned to its initial conical wall-shape. However, the noise-insulating wall, once reversed to be brought into the engaged condition, will not be easily returned to its initial conical wall-shape since its outer peripheral edge is retained by the larger-diameter tubular portion, and therefore this noise-insulating wall will not be easily disengaged from the larger-diameter tubular portion. Therefore, the air layer can be positively maintained, and the high noise-insulating effect can be secured.

The noise-insulating wall will not be easily disengaged from the larger-diameter tubular portion because of its shape, and therefore the rigidity of the noise-insulating wall can be decreased, and therefore the noise-insulating wall can be more easily inserted into the interior of the larger-diameter tubular portion. Namely, the grommet can be mounted with a small force.

The noise-insulating wall, when reversed from the initial shape, is formed into the conical wall-shape tapering in the direction of returning of the smaller-diameter tubular portion to the initial position (that is, the direction of the conical wall-shape of the reversed noise-insulating wall is the forward direction with respect to the direction of returning of the smaller-diameter tubular portion to the initial position), and therefore the smaller-diameter tubular portion can be returned to its original position without hardly receiving a push-back resistance from the noise-insulating wall. Therefore, the smaller-diameter tubular portion can be properly returned to its initial position, so that the dimension of the grommet before setting it on the panel will not substantially differ from the dimension after setting it on the panel. And besides, the noise-insulating wall, reversed into the conical wall-shape whose direction is reverse to that of its initial shape, is held in intimate contact with the inner peripheral surface of the larger-diameter tubular portion by its own restoring force, so that the air-tightness of the closed space is positively maintained.

The noise-insulating wall is formed integrally on the outer peripheral surface of the smaller-diameter tubular portion, and is formed into the outwardly-spreading conical wall-shape, and therefore even when the filling cup portion for the water-stopping material is provided at the proximal end of the smaller-diameter tubular portion, the grommet can be easily produced by a molding operation using a mold.

In the grommet of the invention, the outer diameter of the noise-insulating wall in its free condition before the reversing thereof is larger than the diameter of the inner peripheral surface of the larger-diameter tubular portion with which the outer peripheral edge of the noise-insulating wall can be brought into sliding contact.

In this grommet, the outer diameter of the noise-insulating wall is larger than the inner diameter of the larger-diameter tubular portion, and therefore the force of intimate contact of the noise-insulating wall with the inner peripheral surface of the larger-diameter tubular portion can be increased.

In the grommet of the invention, an engagement portion for retaining the outer peripheral edge of the noise-insulating wall is provided at the inner peripheral surface of the larger-diameter tubular portion.

In this grommet, the outer peripheral edge of the noise-insulating wall is positively engaged with the engagement portion, and therefore will not be easily disengaged therefrom.

In the grommet of the invention, a cylindrical tubular portion, which can be brought into surface-to-surface contact with the inner peripheral surface of the larger-diameter tubular portion to be frictionally engaged with this inner peripheral surface, is formed at the outer peripheral edge of the noise-insulating wall.

In this grommet, the cylindrical tubular portion for frictional engagement with the inner peripheral surface of the larger-diameter tubular portion is provided at the outer peripheral edge of the noise-insulating wall, and therefore the area of intimate contact between the noise-insulating wall and the larger-diameter tubular portion is increased.

In the grommet of the invention, the shield wall is formed into a conical wall-shape tapering toward the proximal end of the smaller-diameter tubular portion, and can be reversed on its outer peripheral edge in such a manner that the direction of its conical wall-shape is reversed, thereby allowing the displacement of the smaller-diameter tubular portion, and the smaller-diameter tubular portion is returned to its initial position by a restoring force of the shield wall which restores it into its initial shape, thereby reversing the noise-insulating wall.

In this grommet, the smaller-diameter tubular portion is returned into its initial position by the strong reversing restoring force of the shield wall produced when this shield wall, brought into the reversed condition by pulling the wire, is restored into its initial shape. Therefore, when the application of the pulling force to the smaller-diameter tubular portion is canceled, the smaller-diameter tubular portion is returned into its initial position by the strong force, and at this time the noise-insulating wall is pulled by the smaller-diameter tubular portion, and is reversed in one breath, thereby forming the closed space. Namely, the strong reversing restoring force of the shield wall can be effectively utilized for reversing the noise-insulating wall, and therefore after the wire is pulled to a certain degree to apply the force to the grommet, this pulling is canceled, and merely by doing so, the grommet can be automatically mounted in the proper condition.

In the grommet of the invention, a filling cup portion for being filled with a water-stopping material, which fills in interstices in the wire passing through the smaller-diameter tubular portion, is formed at the proximal end of the smaller-diameter tubular portion, the filling cup portion being larger in diameter than the smaller-diameter tubular portion.

In this grommet, the interstices in the wire can be sealed by the molten water-stopping material charged into the filling cup portion, and therefore the water-stopping ability can be enhanced.

In the grommet of the invention, the noise-insulating wall extends continuously from an outer peripheral edge of a conical wall forming a bottom surface of the filling cup portion.

In this grommet, the noise-insulating wall extends continuously from the outer peripheral edge of the conical wall forming the bottom surface of the filling cup portion, and therefore as compared with the case where the noise-insulating wall is provided separately from the filling cup portion, the axial dimension of that portion of the smaller-diameter tubular portion, including its proximal end, can be reduced.

BRIEF DESCRIPTION OF THE DRAWINGS

FIGS. 1A to 1C are cross-sectional views showing the construction of a first embodiment of a grommet of the invention, as well as a process of mounting this grommet on a panel;

DETAILED DESCRIPTION OF THE PREFERRED EMBODIMENTS

Figure 2A:
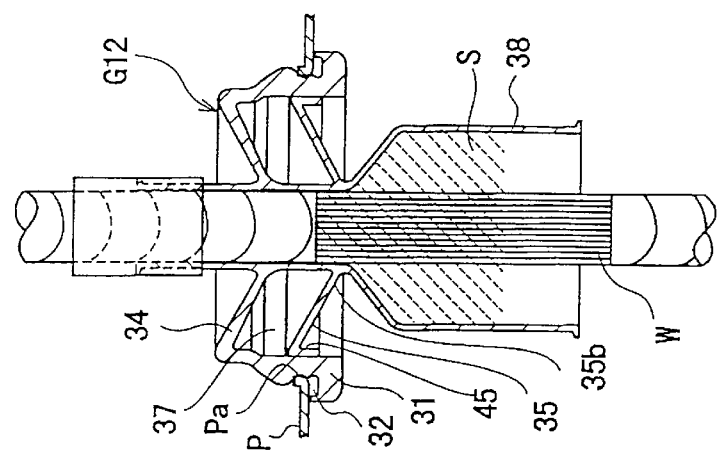
FIGS. 2A to 2C are cross-sectional views showing the construction of a second embodiment of a grommet of the invention, as well as a process of mounting this grommet on a panel.

A preferred embodiment of the present invention will now be described with reference to the drawings.

FIGS. 1A to 1C are cross-sectional views showing the construction of a grommet G11 of the first embodiment and the process of mounting this grommet G11 on a panel P.

This grommet G11 includes a larger-diameter tubular portion 31, having a fitting groove (fitting portion) 32 formed in its outer peripheral surface so as to fit on a peripheral edge of a through hole Pa in the panel P, a smaller-diameter tubular portion 33, which is disposed internally of the larger-diameter tubular portion 31 in concentric relation thereto, and can pass a wire (wire harness) W, passing through the panel through hole Pa, therethrough, a shield wall 34, which interconnects that portion of the smaller-diameter tubular portion 33, disposed intermediate its axial distal and proximal ends 33a and 33b, and a distal end of the larger-diameter tubular portion 31 to close a space between the larger-diameter tubular portion 31 and the smaller-diameter tubular portion 33, and is elastically deformable so as to displace the smaller-diameter tubular portion 33 in the axial direction relative to the larger-diameter tubular portion 31, and a noise-insulating wall 35 which is disposed closer to the proximal end 33b of the smaller-diameter tubular portion 33 than the shield wall 34 is, and is flaring into a conical wall-shape in a direction of extending of the proximal end 33b of the smaller-diameter tubular portion 33, and is joined at its inner peripheral edge 35b to an outer peripheral surface of the smaller-diameter tubular portion 33.

When the smaller-diameter tubular portion 33 is displaced relative to the larger-diameter tubular portion 31 in a direction toward its distal end 33a, an outer peripheral edge 35a of the noise-insulating wall 35, provided as a free edge, is brought into sliding contact with the inner peripheral surface of the larger-diameter tubular portion 31, and in this condition, when the above displacement is canceled, the outer peripheral edge 35a is engaged in an engagement recess (engagement portion) in the inner peripheral surface 31a of the larger-diameter tubular portion 31, so that the noise-insulating wall 35 is reversed on its inner peripheral edge 35b to be formed into a conical wall-shape whose direction is reverse to that of its initial shape, thereby forming a closed space 37 between this noise-insulating wall 35 and the shield wall 34.

An outer diameter D2 of the noise-insulating wall 35 in its free condition before this reversing operation is larger than a diameter D1 of the inner peripheral surface 31a of the larger-diameter tubular portion 31 with which the outer peripheral edge 35a of the noise-insulating wall 35 can be brought into sliding contact.

The shield wall 34 is formed into a conical wall-shape tapering toward the proximal end 33b of the smaller-diameter tubular portion 33, and is reversed on its outer peripheral edge in such a manner that the direction of its conical wall-shape is reversed, thereby allowing the displacement of the smaller-diameter tubular portion 33. The smaller-diameter tubular portion 33 is returned to its initial position by the restoring force of the shield wall 34 which restores it into its initial shape, thereby reversing the noise-insulating wall 35.

A filling cup portion 38 for being filled with a water-stopping material S, which fills in interstices in the wire W passing through the smaller-diameter tubular portion 33, is formed at the proximal end 33b of the smaller-diameter tubular portion 33, the filling cup portion 38 being larger in diameter than the smaller-diameter tubular portion 33.

Next, the operation will be described.

For using this grommet G11, first, the wire W is passed through the smaller-diameter tubular portion 33 as shown in FIG. 1A, and then the water-stopping material S in the molten state is charged into the filling cup portion 38 (In this step, the filling cup portion 38 is directed upward), and is filled in the interstices in the wire W, and the interstices in the wire W are filled with the cured water-stopping material S. Then, the distal end portion of the wire W, to which the grommet G11 in this condition is attached, is passed through the through hole Pa in the panel P. Then, the wire W is pulled by a force F, thereby passing the distal end 33a of the smaller-diameter tubular portion 33 through the panel through hole Pa, and at the same time the larger-diameter tubular portion 31, connected to the shield wall 34, is brought into engagement with the peripheral edge of the panel through hole Pa.

In this condition, when the wire W is further pulled, the shield wall 34 is deformed in the axial direction, with its inner peripheral portion pulled by the smaller-diameter tubular portion 33, and the larger-diameter tubular portion 31 is pulled by this shield wall 34, so that the fitting groove 32 becomes fitted on the peripheral edge of the panel through hole Pa, as shown in FIG. 1B. At this time, the smaller-diameter tubular portion 33 is displaced forward relative to the larger-diameter tubular portion 31 because of the deformation of the shield wall 34, and therefore the outer peripheral edge 35a of the noise-insulating wall 35, formed on the outer peripheral surface of the smaller-diameter tubular portion 33 at the proximal end portion 33b thereof, enters the interior of the larger-diameter tubular portion 31 while this outer peripheral edge 35a is held in sliding contact with the inner peripheral surface of the larger-diameter tubular portion 31.

At this time, the noise-insulating wall 35 has the conical wall-shape tapering in the direction of insertion of this wall 35 into the larger-diameter tubular portion 31 (that is, the direction of the conical wall-shape of the noise-insulating wall 35 is the forward direction, i.e., the direction of insertion of this wall 35 into the larger-diameter tubular portion 31), and therefore the noise-insulating wall 35 can be easily inserted into the larger-diameter tubular portion 31 with a small force without producing a large catching resistance.

When the noise-insulating wall 35 thus enters the interior of the larger-diameter tubular portion 31, with the fitting groove 32 in the larger-diameter tubular portion 31 fitted on the peripheral edge of the panel through hole Pa, the application of the pulling force to the wire W is canceled. As a result, the smaller-diameter tubular portion 33 is returned to its original position because of the restoring action of the shield wall 34 as shown in FIG. 1C, and the noise-insulating wall 35, which is restrained with its outer peripheral edge 35a engaged in the engagement recess 39 in the inner peripheral surface 31a of the larger-diameter tubular portion 31, is reversed on its inner peripheral edge 35b to be formed into the conical wall-shape whose direction is reverse to that of its initial shape, thereby forming the closed space 37 between this noise-insulating wall 35 and the shield wall 34. This closed space 37 functions as an air layer isolated from the exterior, so that the noise-insulating ability of the grommet G11 is enhanced.

As shown in FIGS. 1A and 1B, the noise-insulating wall 35, which is to be inserted into the larger-diameter tubular portion 31 so as to form the closed space (air layer) 37 between this wall 35 and the shield wall 34, is formed into the outwardly-spreading conical wall-shape, and therefore this noise-insulating wall 35 can be inserted into the larger-diameter tubular portion 31 with a small force. And besides, when the smaller-diameter tubular portion 33 is returned to its initial position as shown in FIG. 1C after the noise-insulating wall 35 is inserted into the larger-diameter tubular portion 31, the noise-insulating wall 35 is reversed into the reversely-directed conical wall-shape, and therefore this noise-insulating wall 35, after reversed, will not be easily disengaged from the larger-diameter tubular portion 31.

Namely, in the condition of use shown in FIG. 1C, in order that the outer peripheral edge 35a of the noise-insulating wall 35 can be disengaged from the larger-diameter tubular portion 31, the noise-insulating wall 35 need to be reversed to be returned to its initial conical wall-shape. However, the noise-insulating wall 35, once reversed to be brought into the engaged condition, will not be easily returned to its initial conical wall-shape, and therefore will not be easily disengaged from the larger-diameter tubular portion 31. Therefore, the air layer (closed space 37) can be positively maintained, and the high noise-insulating effect can be secured.

Thus, the noise-insulating wall 35, once reversed, will not be easily disengaged from the larger-diameter tubular portion 31, and therefore the wall thickness of the noise-insulating wall 35 can be reduced so as to decrease its rigidity, thereby imparting flexibility to it. By thus decreasing the rigidity, the noise-insulating wall 35 can be more easily inserted into the larger-diameter tubular portion 31. Therefore, there is provided the grommet in which the noise-insulating wall 35 can be easily mounted in the predetermined position, and besides the noise-insulating wall 35, once mounted, will not be easily disengaged.

The noise-insulating wall 35, when reversed from the initial shape, is formed into the conical wall-shape tapering in the direction of returning of the smaller-diameter tubular portion 33, as shown in FIG. 1C. Therefore, this noise-insulating wall will not hinder the returning movement of the smaller-diameter tubular portion 33, and the smaller-diameter tubular portion 33 can be properly returned to its initial position, so that the dimension of the grommet G11 before setting it on the panel P will not differ from the dimension after setting it on the panel P. Namely, the dimension c from the fitting groove 32 to the distal end of the grommet G11 before mounting it on the panel P as shown in FIG. 1A is hardly different from the dimension d after mounting the grommet G11 on the panel P as shown in FIG. 1C. Therefore, the wire W can be mounted accurately in the predetermined position.

The noise-insulating wall 35 is formed integrally on the outer peripheral surface of the smaller-diameter tubular portion 33, and is formed into the outwardly-spreading conical wall-shape, and therefore although the filling cup portion 38 for the water-stopping material S is provided at the proximal end 33b of the smaller-diameter tubular portion 33, the grommet can be easily produced without any problem by a molding operation using a mold.

And besides, the noise-insulating wall 35, reversed into the conical wall-shape whose direction is reverse to that of the initial shape, is held in intimate contact with the inner peripheral surface 31a of the larger-diameter tubular portion 31 because of its own restoring force, and therefore the closed space 37 is positively kept in an air-tight condition.

In the case of this grommet G11, the shield wall 34 is formed into the conical wall-shape whose direction is reverse to that of the conical wall-shape of the noise-insulating wall 35, and the smaller-diameter tubular portion 33 is returned into its initial position by the strong reversing restoring force of the shield wall 34 produced when this shield wall 34, brought into the reversed condition by pulling the wire W as shown in FIG. 1B, is restored into its initial shape as shown in FIG. 1C. Therefore, when the application of the pulling force to the smaller-diameter tubular portion 33 is canceled, the smaller-diameter tubular portion 33 is returned into its initial position by the strong force, and at this time the noise-insulating wall 35 is pulled by the smaller-diameter tubular portion 33, and is reversed in one breath, thereby forming the closed space 37. Namely, the strong reversing restoring force of the shield wall 34 can be effectively utilized for reversing the noise-insulating wall 35, and therefore after the wire W is pulled to a certain degree to apply the force to the grommet, this pulling is canceled, and merely by doing so, the grommet G11 can be automatically mounted in the proper condition.

In this grommet G11, the outer diameter D2 of the noise-insulating wall 35 is larger than the inner diameter D1 of the larger-diameter tubular portion 31, and the engagement recess 39, in which the outer peripheral edge 35a of the noise-insulating wall 35 can be retainingly engaged, is formed in the inner peripheral surface 31a of the larger-diameter tubular portion 31. Therefore, the force of intimate contact of the noise-insulating wall 35 with the inner peripheral surface 31a of the larger-diameter tubular portion 31 can be increased, and besides the noise-insulating wall 35 can not be easily disengaged. Therefore, the positive, high noise-insulating ability can be maintained.

Figure 2B:
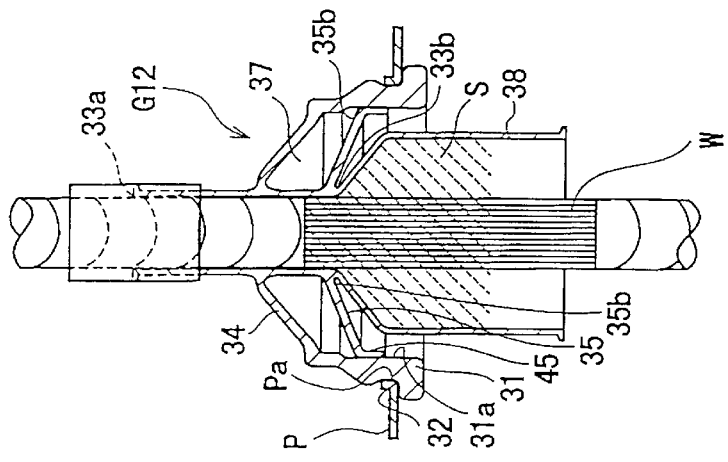
Figure 2C:
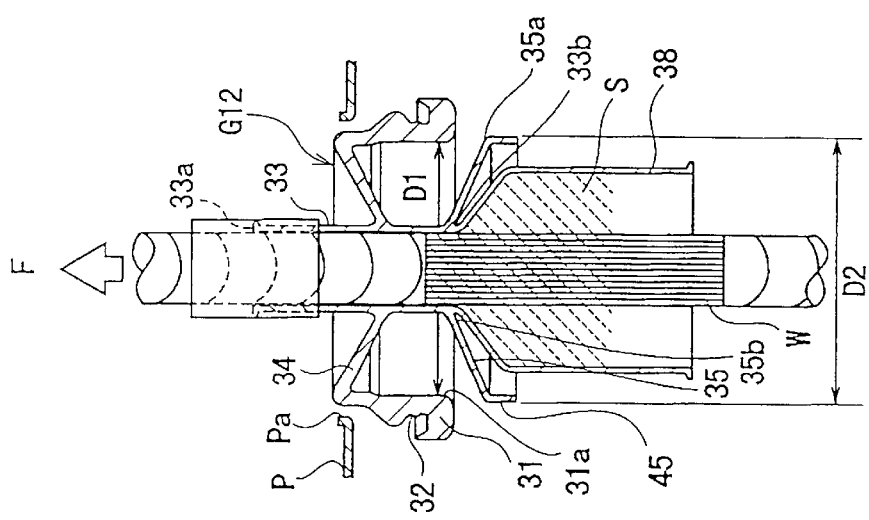

FIGS. 2A to 2C are cross-sectional views showing the construction of a grommet G12 of a second embodiment and the process of mounting this grommet G12 on the panel P.

The grommet G12 of this second embodiment differs from the grommet G11 of the first embodiment in that a cylindrical tubular portion 45, which can be brought into surface-to-surface contact with an inner peripheral surface 31a of a larger-diameter tubular portion 31 to be frictionally engaged with this inner peripheral surface 31a, is formed at an outer peripheral edge 35a of a noise-insulating wall 35, and that the provision of the engagement recess 39 (see FIG. 1) in the inner peripheral surface 31a of the larger-diameter tubular portion 31 of the grommet G11 of the first embodiment is omitted. The other points are the same as those of the grommet G11 of the first embodiment, and therefore identical constituent elements will be designated by identical reference numerals, respectively, and detailed explanation thereof will be omitted.

The cylindrical tubular portion 45 is formed on and extends from the outer peripheral edge 35a of the noise-insulating wall 35 in a direction of extending of a proximal end 33b of a smaller-diameter tubular portion 33. The relation between an outer diameter D2 of the cylindrical tubular portion 45 and an inner diameter D1 of the smaller-diameter tubular portion 33 is represented by D1<D2 as in the first embodiment.

In this grommet G12, the area of intimate contact between the noise-insulating wall 35 and the larger-diameter tubular portion 31 is increased thanks to the cylindrical tubular portion 45 formed at the outer peripheral edge 35a of the noise-insulating wall 35, and therefore the air-tightness of a closed space 37 is enhanced, so that the noise-insulating ability is enhanced. Although there is not provided the engagement recess 39, the noise-insulating wall 35 will not be easily disengaged, and the positive noise-insulating ability is maintained.

Figure 3:
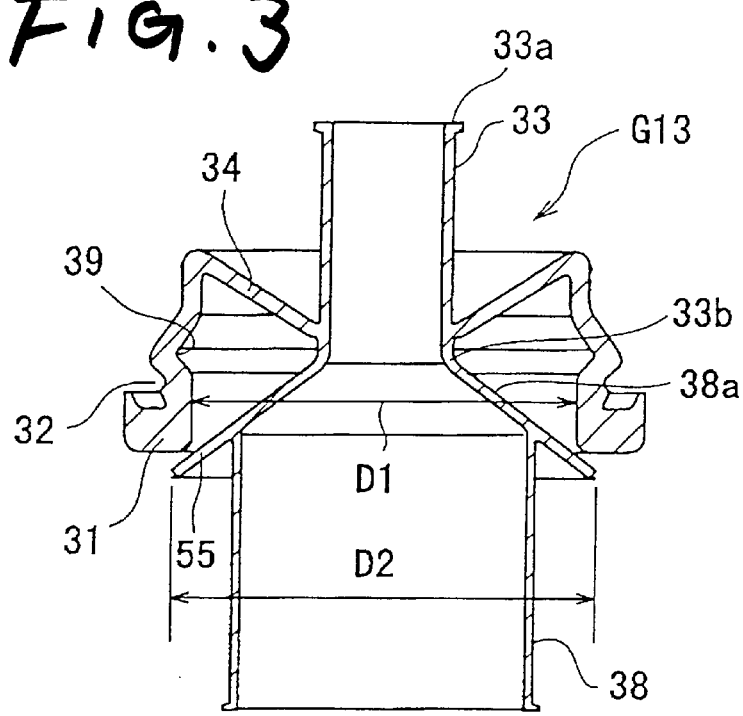
FIG. 3 is a cross-sectional view of a third embodiment of a grommet of the invention.

In the above embodiments, although in addition to the filling cup portion 38, the noise-insulating wall 35 extends from the outer peripheral surface of the smaller-diameter tubular portion 33, there may be provided a noise-insulating wall 55 extending continuously from an outer peripheral edge of a conical wall 38a, forming a bottom surface of a filling cup portion 38, as in a grommet G13 of a third embodiment shown in FIG. 3. In this construction, as compared with the grommet G11 of the first embodiment in which the noise-insulating wall 35 is provided separately from the filling cup portion 38, the axial dimension of that portion of the smaller-diameter tubular portion 33, including its proximal end 33b, can be reduced, so that a compact design of the grommet G13 can be achieved.

Figure 4:
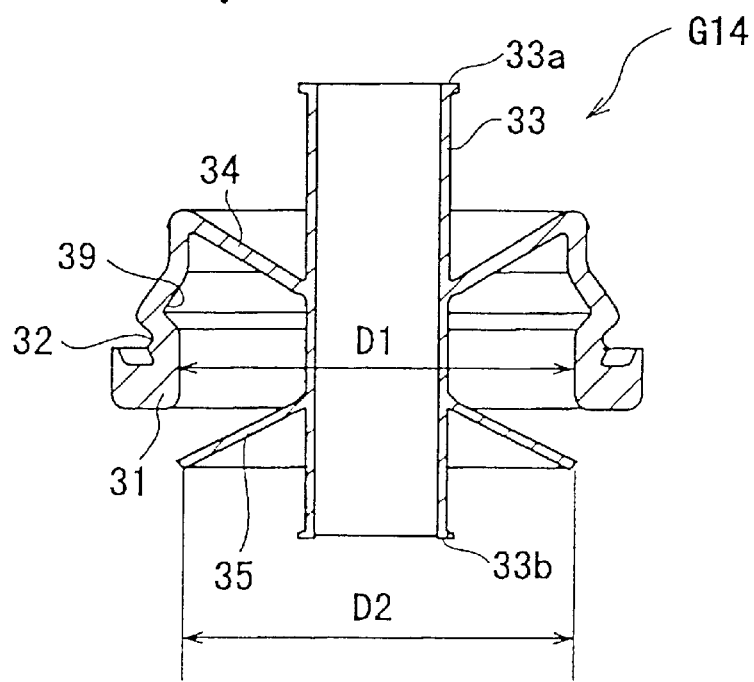
FIG. 4 is a cross-sectional view of a fourth embodiment of a grommet of the invention.
Figure 5A:
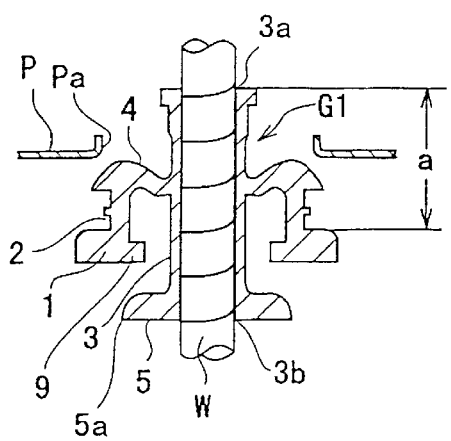
FIGS. 5A to 5D are cross-sectional views showing a process of mounting a conventional grommet on a panel.
Figure 5B:
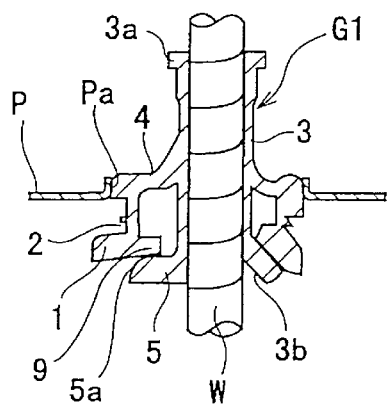
Figure 5C:
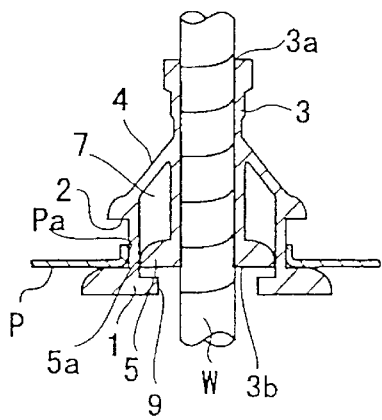
Figure 5D:
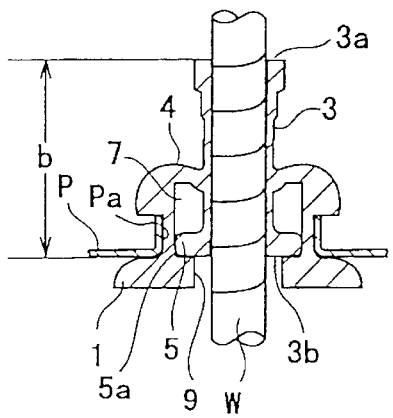
Figure 6:
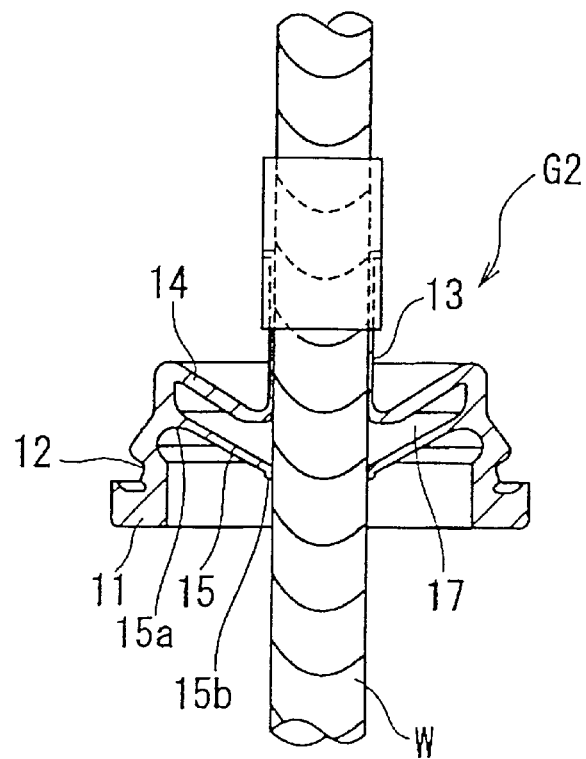
FIG. 6 is a cross-sectional view showing another conventional grommet attached to a wire.
Figure 7:
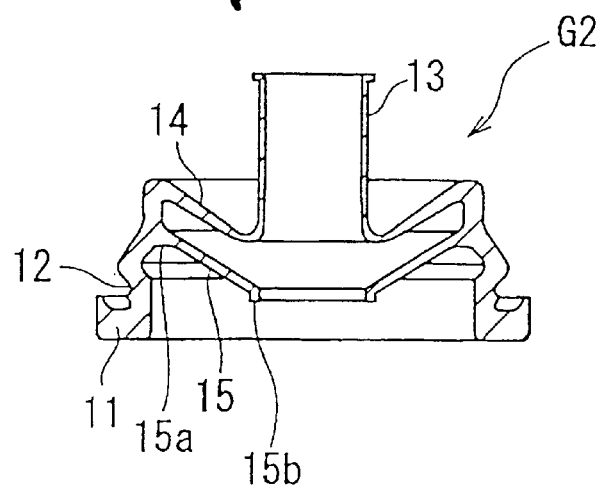
FIG. 7 is a cross-sectional view showing the grommet of FIG. 6 alone.
Figure 8:
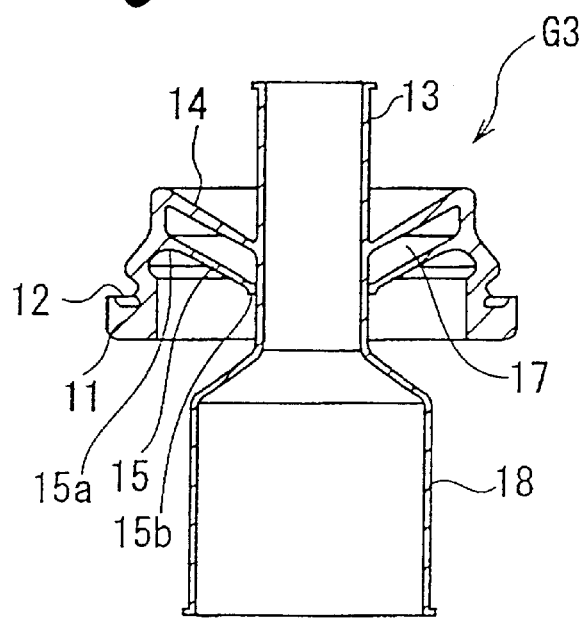
FIG. 8 is a cross-sectional view showing a grommet of a water-stopping material-filling type to which the idea of the grommet of FIG. 7 is applied.

As in a grommet G14 of a fourth embodiment shown in FIG. 4, the provision of the filling cup portion 38 may be omitted.

In the grommets G11, G13 and G14 of FIGS. 1A through 1C, 3 and 4, although the engagement recess 39, in which the outer peripheral edge 35a of the noise-insulating wall 35 can be retainingly engaged, is formed in the inner peripheral surface 31a of the larger-diameter tubular portion 31, this engagement recess may be replaced by an engagement projection. Anyway, it is only necessary to provide a portion of such a shape that the outer peripheral edge 35a of the noise-insulating wall 35 can be easily brought into retaining engagement therewith.

As described above, in the present invention, the noise-insulating wall, which can be inserted into the interior of the larger-diameter tubular portion to form, together with the shield wall, the closed space (air layer) therebetween, is formed into the outwardly-spreading conical wall-shape, and therefore this noise-insulating wall can be inserted into the interior of the larger-diameter tubular portion with a small force. And besides, when the smaller-diameter tubular portion is returned to its initial position after the noise-insulating wall is inserted into the larger-diameter tubular portion, this noise-insulating wall is reversed into the conical wall-shape whose direction is reverse to that of its initial shape, and therefore the noise-insulating wall, after reversed, will not be easily disengaged from the larger-diameter tubular portion. Namely, a small force is required for reversing the noise-insulating wall from its initial shape. However, the noise-insulating wall, once reversed, cannot be easily returned from the reversed condition to the original condition since the outer peripheral edge thereof is retained by the larger-diameter tubular portion, and therefore the closed space can be positively maintained, so that the high noise-insulating ability can be maintained. The noise-insulating wall, once reversed, will not be easily disengaged, and therefore the rigidity of the noise-insulating wall can be decreased, and by thus decreasing the rigidity, the noise-insulating wall can be more easily inserted into the interior of the larger-diameter tubular portion. Therefore, there can be provided the grommet in which the noise-insulating wall can be easily set in the predetermined position, and the noise-insulating wall, once set in this manner, will not be easily disengaged.

The noise-insulating wall, when reversed from the initial shape, is formed into the conical wall-shape tapering in the direction of returning of the smaller-diameter tubular portion, and therefore the noise-insulating wall will not prevent the returning movement of the smaller-diameter tubular portion. The smaller-diameter tubular portion can be properly returned to its initial position, so that the dimension of the grommet before setting it on the panel will not differ from the dimension after setting it on the panel. Therefore, the wire can be properly set in the predetermined position.

The noise-insulating wall is formed integrally on the outer peripheral surface of the smaller-diameter tubular portion, and is formed into the outwardly-spreading conical wall-shape, and therefore even when the filling cup portion for the water-stopping material is provided at the proximal end of the smaller-diameter tubular portion, the grommet can be easily produced by a molding operation using a mold.

In the invention, the force of intimate contact of the noise-insulating wall with the inner peripheral surface of the larger-diameter tubular portion can be increased. Therefore, the noise-insulating wall will not be easily disengaged, and the noise-insulating ability can be enhanced.

In the invention, the noise-insulating wall will not be easily disengaged, so that the positive noise-insulating effect can be maintained.

In the invention, the area of intimate contact between the noise-insulating wall and the larger-diameter tubular portion is increased, and the noise-insulating ability is enhanced, and the noise-insulating wall will not be easily disengaged, so that the positive noise-insulating effect can be maintained. And besides, the positive frictional engagement is achieved by the cylindrical tubular portion, and therefore any special engagement portion does not need to be provided at the larger-diameter tubular portion.

In the invention, the noise-insulating wall is reversed, utilizing the reversing restoring force of the shield wall, and therefore the mounting can be effected easily and positively.

In the invention, the interstices in the wire can be sealed by the use of the water-stopping material, so that the water-stopping ability can be enhanced. Although the filling cup portion is provided at the proximal end of the smaller-diameter tubular portion, the noise-insulating wall is connected not to the larger-diameter tubular portion but to the smaller-diameter tubular portion, and therefore the grommet can be molded without any problem, using a mold.

In the invention, the axial dimension of that portion of the smaller-diameter tubular portion, including its proximal end, can be reduced, and the compact design of the grommet can be achieved.

What is claimed is:

1. A grommet comprising:
   a larger-diameter tubular portion having a fitting portion for fitting on a peripheral edge of a through hole;
   a smaller-diameter tubular portion for passing therethrough a wire penetrating said through hole;

a shield wall which interconnects an axially-intermediate portion of said smaller-diameter tubular portion and said larger-diameter tubular portion to close a space between said larger-diameter tubular portion and said smaller-diameter tubular portion, and is elastically deformable so as to displace said smaller-diameter tubular portion in an axial direction thereof relative to said larger-diameter tubular portion; and a noise-insulating wall which is disposed closer to a proximal end of said smaller-diameter tubular portion than said shield wall is, and is flaring into a conical wall-shape in a direction of extending of the proximal end of said smaller-diameter tubular portion, and is joined at the inner peripheral edge thereof to an outer peripheral surface of said smaller-diameter tubular portion;

wherein when said smaller-diameter tubular portion is displaced relative to said larger-diameter tubular portion in a direction toward a distal end of said smaller-diameter tubular portion, an outer peripheral edge of said noise-insulating wall is brought into sliding contact with an inner peripheral surface of said larger-diameter tubular portion, and when such the displacement of said smaller-diameter tubular portion is canceled, said outer peripheral edge of said noise-insulating wall is engaged with the inner peripheral surface of said larger-diameter tubular portion, so that said noise-insulating wall is reversed on the inner peripheral edge thereof to be formed into a conical wall-shape whose direction is reverse to that of the initial shape, thereby forming a closed space between said noise-insulating wall and said shield wall.

2. The grommet according to claim 1, wherein an outer diameter of said noise-insulating wall is larger than a diameter of the inner peripheral surface of said larger-diameter tubular portion in free condition of said noise-insulating wall before the reversing thereof, and the outer peripheral edge of said noise-insulating wall is brought into sliding contact with the inner peripheral surface of said larger-diameter.

3. The grommet according to claim 1, wherein an engagement portion for retaining the outer peripheral edge of said noise-insulating wall is provided at the inner peripheral surface of said larger-diameter tubular portion.

4. The grommet according to claim 1, further comprising a cylindrical tubular portion formed at the outer peripheral edge of said noise-insulating wall, said cylindrical tubular portion being brought into surface-to-surface contact with the inner peripheral surface of said larger-diameter tubular portion thereby frictionally engaged with said inner peripheral surface.

5. The grommet according to claim 1, wherein said shield wall is formed into a conical wall-shape tapering toward the proximal end of said smaller-diameter tubular portion, and allowing to be reversed on the outer peripheral edge thereof in such a manner that the direction of the conical wall-shape thereof is reversed, thereby allowing the displacement of said smaller-diameter tubular portion, and said smaller-diameter tubular portion is returned to the initial position thereof by a restoring force of said shield wall which restores it into the initial shape, thereby reversing said noise-insulating wall.

6. The grommet according to claim 1, further comprising a filling cup portion at the proximal end of said smaller-diameter tubular portion for being filled with a water-stopping material sealing interstices in said wire passing through said smaller-diameter tubular portion, said filling cup portion being larger in diameter than said smaller-diameter tubular portion.

7. The grommet according to claim 6, wherein said noise-insulating wall extends continuously from an outer peripheral edge of a conical wall forming a bottom surface of said filling cup portion.

8. The grommet according to claim 6, wherein the noise-insulating wall is joined to the outer peripheral surface of said smaller-diameter tubular portion at an axial position that is closer to the distal end of said smaller-diameter tubular portion than an axial position at which the filling cup portion is joined to said smaller-diameter tubular portion.

9. The grommet according to claim 1, wherein an axial position in which said shield wall interconnects said smaller-diameter tubular portion is closer to the proximal end than an axial position in which the shield wall interconnects said larger-diameter tubular portion; and wherein, in the case that said smaller-diameter tubular portion is displaced relative to said larger-diameter tubular portion in a direction toward a distal end of said smaller-diameter tubular portion, the axial position in which the shield wall interconnects said larger-diameter tubular portion is closer to said proximal end than the axial position in which the shield wall interconnects said smaller-diameter tubular portion; and wherein, in the case that the displacement of said smaller-diameter tubular portion is canceled and said noise-insulating wall is engaged with the inner peripheral surface of said larger-diameter tubular portion, the axial position in which said shield wall interconnects said smaller-diameter tubular portion is closer to the proximal end than the axial position in which the shield wall interconnects said larger-diameter tubular portion.

* * * * *